United States Patent
Edlin

(10) Patent No.: US 7,426,976 B2
(45) Date of Patent: Sep. 23, 2008

(54) LAWN MOWER STEERING CONTROL ADAPTER

(75) Inventor: Everett Hugh Edlin, Southhaven, MS (US)

(73) Assignee: Edlin's Enterprises, Inc., South Haven, MS (US)

( * ) Notice: Subject to any disclaimer, the term of this patent is extended or adjusted under 35 U.S.C. 154(b) by 29 days.

(21) Appl. No.: 11/669,487

(22) Filed: Jan. 31, 2007

(65) Prior Publication Data

US 2008/0178568 A1 Jul. 31, 2008

(51) Int. Cl.
*B62D 1/14* (2006.01)
*B62K 21/12* (2006.01)

(52) U.S. Cl. ............... 180/332; 74/551.1; 180/333; 280/778

(58) Field of Classification Search ............ 16/426; 74/473.1, 473.13, 473.3, 523, 524, 551.1, 74/551.8, 551.9; 180/315, 319, 320, 332, 180/333, 334, 336; 280/47.371, 778
See application file for complete search history.

(56) References Cited

U.S. PATENT DOCUMENTS

| | | | |
|---|---|---|---|
| 586,678 A | 7/1897 | Walsh | |
| 1,448,921 A * | 3/1923 | Ershkowitz | 74/551.8 |
| 1,651,587 A * | 12/1927 | Dehne | 74/551.1 |
| 3,503,276 A * | 3/1970 | Vigot | 74/544 |
| 3,760,648 A * | 9/1973 | Hoffman | 74/489 |
| 3,905,242 A * | 9/1975 | Hoffman | 74/480 R |
| 4,143,734 A * | 3/1979 | Bhattacharya | 180/333 |
| D263,293 S | 3/1982 | Janson | |
| 4,476,643 A * | 10/1984 | Hilchey et al. | 37/245 |
| 4,641,849 A * | 2/1987 | De Cortanze | 280/270 |
| 4,708,357 A | 11/1987 | Soderbaum | |
| 4,872,697 A | 10/1989 | Berkowitz | |
| 5,290,055 A | 3/1994 | Treat, Jr. | |
| 5,595,259 A * | 1/1997 | Gilliland et al. | 180/332 |
| 5,946,894 A | 9/1999 | Eavenson et al. | |
| 6,026,634 A | 2/2000 | Peter et al. | |
| 6,070,690 A | 6/2000 | Eavenson et al. | |
| 6,176,337 B1 * | 1/2001 | McConnell et al. | 180/208 |
| 6,434,917 B1 | 8/2002 | Bartel | |
| 6,631,607 B1 | 10/2003 | Kaesgen | |
| 6,729,115 B2 | 5/2004 | Bartel | |
| 6,769,501 B2 * | 8/2004 | Iida et al. | 180/19.3 |
| 6,983,583 B2 | 1/2006 | Bucher | |
| 7,096,992 B2 * | 8/2006 | Rogg et al. | 180/332 |
| 7,275,615 B2 * | 10/2007 | Derby et al. | 180/333 |
| 2004/0251073 A1 * | 12/2004 | Gerbier et al. | 180/333 |
| 2005/0150708 A1 * | 7/2005 | Lohmann et al. | 180/332 |
| 2005/0229735 A1 * | 10/2005 | Fujii | 74/473.3 |
| 2006/0017273 A1 | 1/2006 | Woerman | |

FOREIGN PATENT DOCUMENTS

JP 02244310 A * 9/1990
WO WO 99/40499 8/1999

* cited by examiner

*Primary Examiner*—Laura Freedman
(74) *Attorney, Agent, or Firm*—Harvey Kauget

(57) ABSTRACT

The present invention provides a control adapter for use with an existing dual lever lawn tractor that allows an operator to use a single hand in operating tile dual lever lawn tractor. Existing dual lever lawn tractors require an operator to use one hand on each lever to operate the lawn tractor. The control adapter of the present invention is operatively connected to the first control lever and to the second control lever of the dual lever lawn tractor which allows the operator to use a single hand in operating the dual lever lawn tractor.

6 Claims, 4 Drawing Sheets

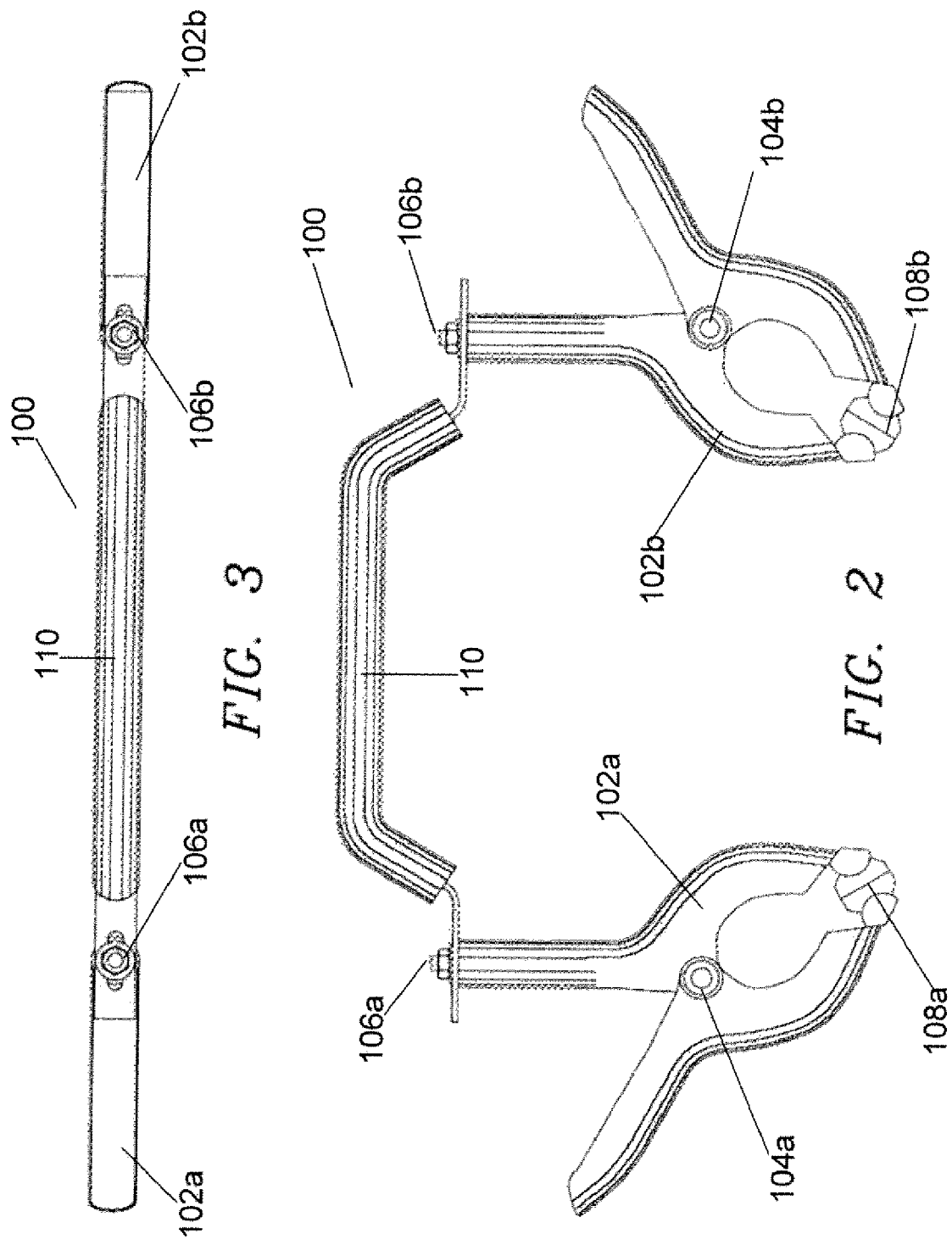

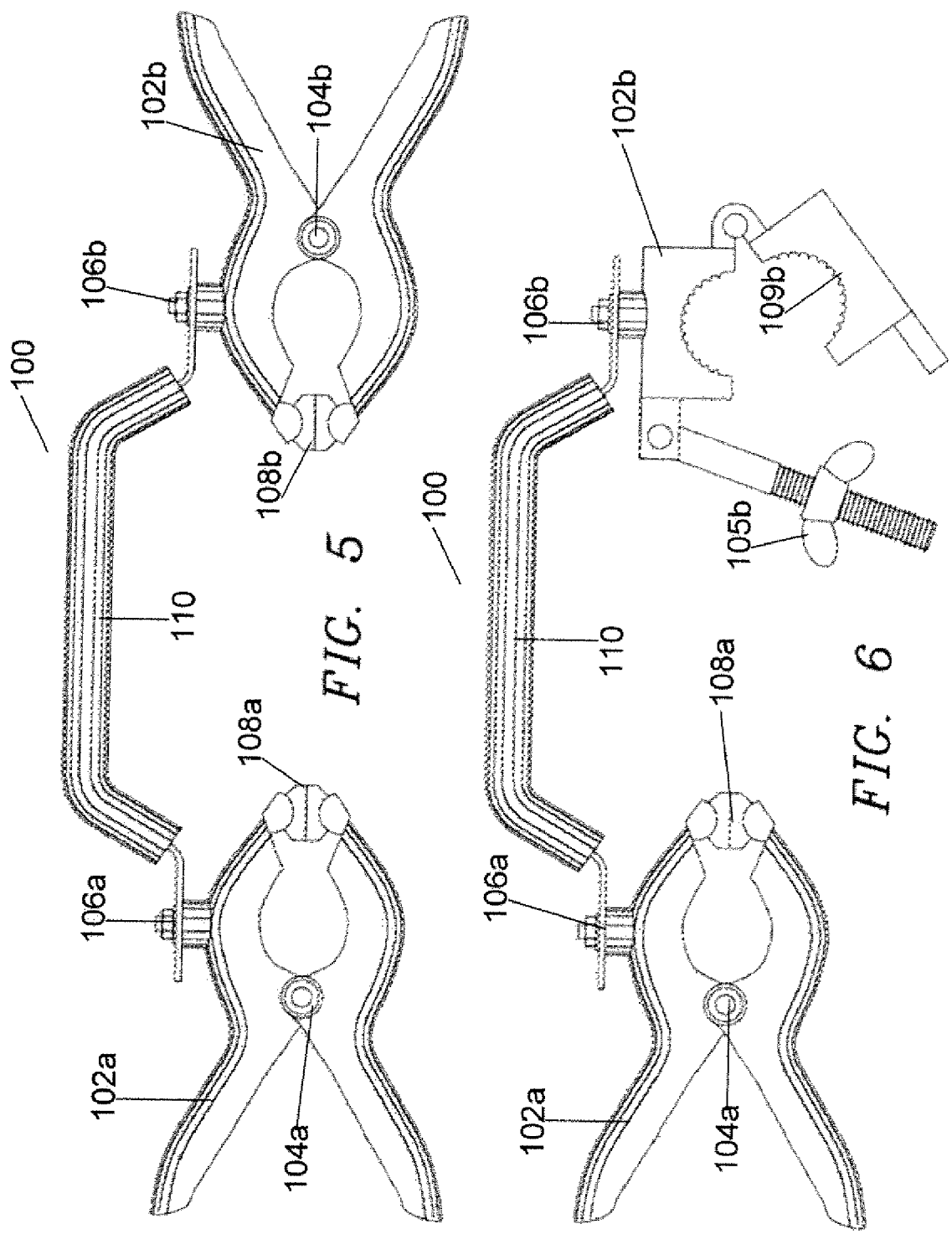

LAWN MOWER STEERING CONTROL ADAPTER

FIELD OF THE INVENTION

This invention pertains to the art of methods and apparatuses for use in lawn and garden care, and more specifically to methods and apparatuses for controlling the speed and direction of a dual lever lawn tractor.

BACKGROUND

It is well known to provide lawn tractors (lawnmowers) that have dual levers where each lever provides direction control and speed control. These lawn tractors typically have a pair of side-by-side levers which move forward and aft from a neutral position to achieve variable speed and steering. These two essentially vertically positioned levers can be positioned close together between the operator's knees or positioned out to the sides of the operator. Each lever independently controls the speed of one of the drive wheels which permits a variety of maneuvers including rotating one wheel forward while rotating the other backward, which causes the mower to turn within its own dimensions. This maneuverability is often referred to as a zero turning radius lawnmower.

Since a typical zero turn lawnmower has two independent control levers, an operator is required to use two hands to control such a lawnmower since each control lever controls the speed and the direction of one of the drive wheels. For example, to make a zero radius turn it is necessary to use one hand to operate one drive lever to actuate one of the drive wheels in a first or forward direction while simultaneously using the other hand to operate the other lever to actuate the other drive wheel in a second or reverse direction.

Thus, there is a need for an apparatus that can be adapted to existing dual lever lawn tractors that allows an operator to use a single hand to both steer and drive a dual lever lawn tractor.

Nothing in the prior art provides the benefits attendant with the present invention.

Therefore, it is an object of the present invention to provide an improvement which overcomes the inadequacies of the prior art devices and which is a significant contribution to the advancement of the lawnmower art.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a control adapter that can be utilized on existing dual lever lawnmowers that allows an operator to use a single hand in operating the dual lever lawnmower.

A feature of the present invention is to provide a lawn tractor comprising a frame; a drive system connected to said frame; a first drive wheel, said first drive wheel being operatively connected to said frame, said first drive wheel being selectively rotated by said drive system; a first control lever supported by said frame, said first control lever being operatively connected to said drive system and to said first drive wheel; a second drive wheel, said second drive wheel being operatively connected to said frame, said second drive wheel being selectively rotated by said drive system; a second control lever supported by said frame, said second control lever being operatively connected to said drive system and to said second drive wheel; and a control adapter, said control adapter being operatively connected to said first control lever and to said second control lever.

Another feature of the present invention is to provide a lawn tractor comprising a frame; a drive system connected to said frame; at least one drive wheel, said drive wheel being operatively connected to said frame, said drive wheel being selectively rotated by said drive system; a first control lever supported by said frame, said first control lever being operatively connected to said drive system; a second control lever supported by said frame, said second control lever being operatively connected to said drive system; and a control adapter, said control adapter being operatively connected to said first control lever and to said second control lever.

Yet another feature of the present invention is to provide a lawn tractor comprising a frame; a first control lever supported by said frame; a second control lever supported by said frame; and a control adapter said control adapter being operatively connected to said first control lever and to said second control lever.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 2 is a perspective view of the control adapter of the present invention wherein the clamping mechanisms are rotationally connected to a single hand grip member of the control adapter;

FIG. 3 is a top perspective view of the control adapter of the present invention;

FIG. 5 is a perspective view of the control adapter of the present invention wherein the clamping mechanisms are flexibly connected to a single hand grip member of the control adapter; and FIG. 6 is a perspective view of the control adapter of the present invention showing an embodiment using a clamping mechanism that is spring actuated for one clamp and a clamping mechanism that uses a fly nut for the other clamp.

Similar reference characters refer to similar parts throughout the several views of the drawings.

DETAILED DESCRIPTION OF THE INVENTION

Figure 1:
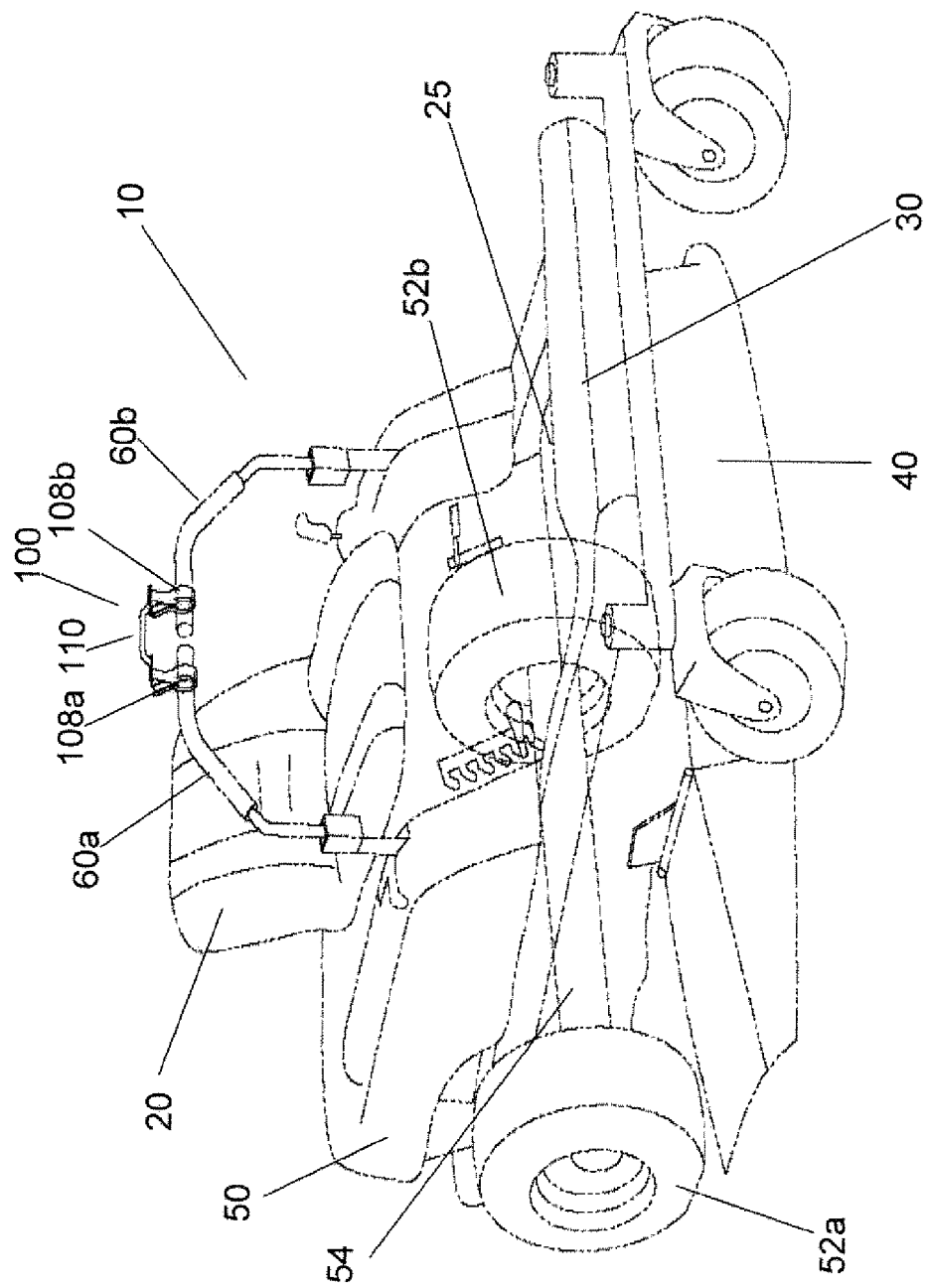
FIG. 1 is a perspective view of a dual lever controlled lawn tractor showing the control adapter of the present invention attached to the control levers of the dual lever controlled lawn tractor.

Referring now to the drawings wherein the showings are for purposes of illustrating a preferred embodiment of the invention only and not for purposes of limiting the same, FIG. 1 shows a lawn tractor (lawnmower) 10 that is equipped with the present invention, a control adapter 100.

FIG. 1 illustrates the lawn tractor 10 having an optional operator seat 20 being operatively mounted to a frame 30. The lawnmower 10 may also include a foot board 25 supported by the frame 30 for supporting an operator's feet. The lawn tractor may also have a mower deck 40 suspended from the frame 30 for use in cutting vegetation as is commonly known in the art.

A drive system 50 is also mounted to the frame 30 as shown in FIG. 1. The drive system 50 can be of any type currently used in the art such as an engine and provides rotation for one or more drive wheels 52 as is commonly known in the art. The preferred embodiment shown in FIG. 1 includes a first drive wheel 52a and a second drive wheel 52b. The drive system 50 may include a transmission to direct the power from the engine to drive the drive wheels 52a, 52b in a forward or reverse direction. The drive system 50 may be enclosed within a housing as shown in FIG. 1. In the illustrated construction, the two rear wheels 52a, 52b may be coupled on a single axle 54 and may both rotate about the same rotational axis.

In the illustrated construction of FIG. 1, the lawnmower 10 has a first control lever 60a and a second control lever 60b for the independent forward and reverse operation of the drive wheels 52a, 52b. Without the control adapter 100 of the present invention, each lever 60a, 60b requires the operator to use one hand per lever 60a, 60b in order to drive and steer the lawnmower 10. The operative connections between the levers 60a, 60b, the drive system 50, and the drive wheels 52a, 52b can be of any type currently known in the art and therefore will not be discussed further. Each control lever 60a, 60b independently controls the corresponding drive wheel 52a, 52b on the respective side of the lawnmower 10. The lawnmower 10 utilizes the independent drive wheels 52a, 52b to both propel the lawnmower 10 and steer the lawnmower 10. Thus, the lawnmower 10 shown in FIG. 1, uses the power transferred to the drive system 50 to also steer the lawnmower 10. For example, to make a soft right turn, the lawnmower 10 may rotate the left wheel 52a in a forward direction relatively faster than the right wheel 52b. To make a hard right turn, the lawnmower 10 may rotate the left wheel 52a in a forward direction while stopping the right wheel 52b. To make a zero-radius right turn, the lawnmower 10 may rotate the left wheel 52a in a forward direction while rotating the right wheel 52b in a reverse direction. However, it is not a requirement for this invention that the lawn tractor 10 be a zero turn tractor. Thus, the invention is not limited to the illustrated lawnmower 10 of FIG. 1.

As shown in FIG. 1, a control adapter 100 is provided that is operatively connected 108a to the first control lever 60a and connected 108b to the second control lever 60b. The control adapter 100 of the present invention allows the operator to use a single hand to simultaneously control both levers 60a, 60b via a single hand grip member 110. The control adapter 100 is mechanically connected 108a, 108b to each of the levers 60a, 60b of the lawnmower 10 to convert existing dual lever 60a, 60b lawnmowers 10 that require two hands into a single hand operated system.

FIG. 2 shows an embodiment of the control adapter 100 of the present invention comprising a first clamping member 102a having a spring release 104a, a second clamping member 102b having a spring release 104b, and a single hand grip member 110. The single hand grip member 110 is rotationally connected 106a to the first clamping member 102a at one end and is rotationally connected 106b to the second clamping member 102b at the other end. In this embodiment, the single hand grip member 10 of the control adapter 100 is rigid and is shaped in a such a manner to allow the rider to use one hand to adjust the control adapter 100. In using the present invention, the operator exerts either a twisting force or a horizontal force with one hand on the single hand grip member 110 to simultaneously actuate the movement of the control levers of an existing dual lever lawnmower to both drive and steer the lawnmower. FIG. 3 is a top perspective view of the control adapter 100 of the present invention as shown in FIG. 2 showing the single hand grip member 110 being rotationally connected 106a to the first clamping member 102a at one end and being rotationally connected 106b to the second clamping member 102b at the other end.

Figure 4:
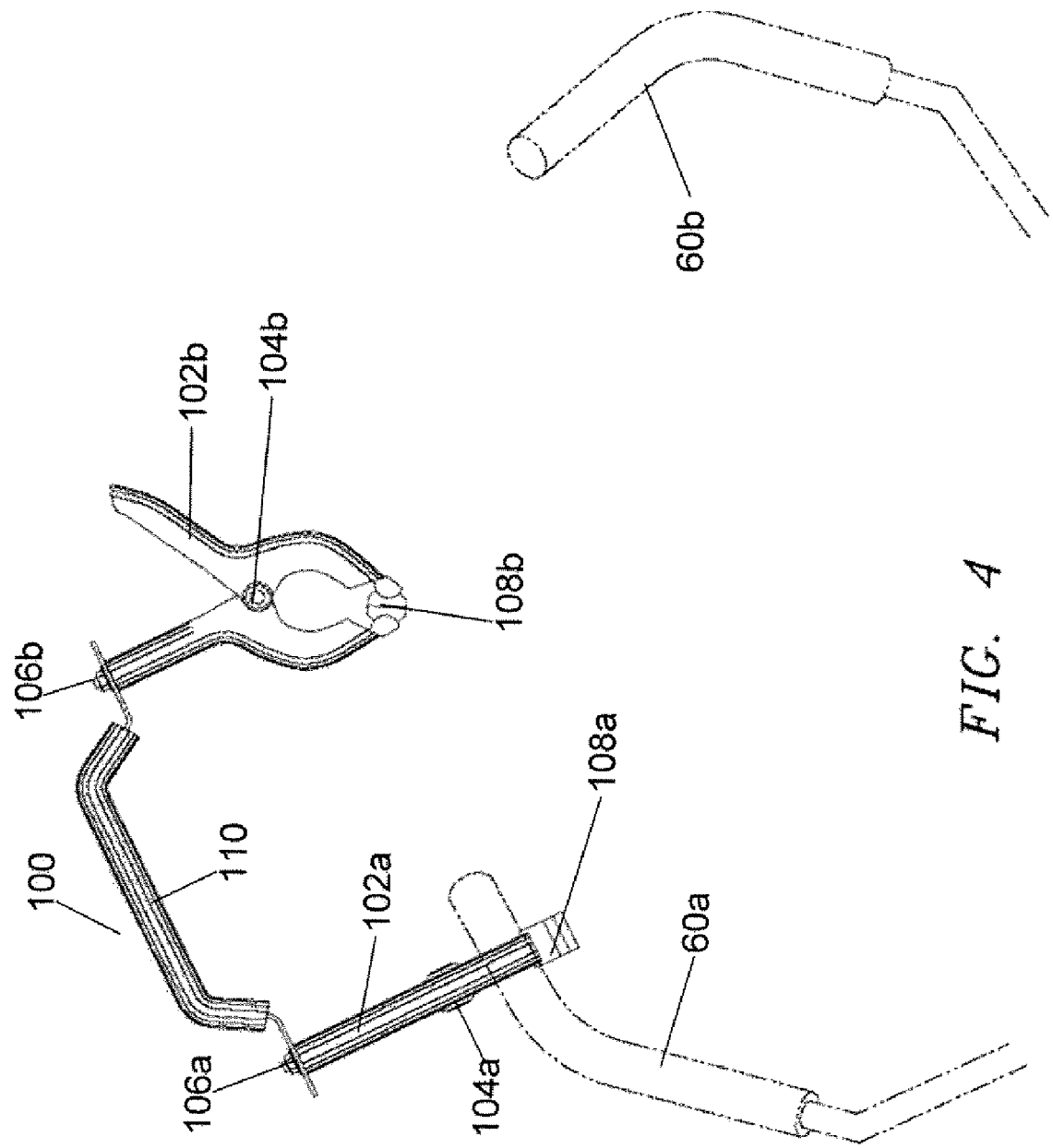
FIG. 4 is a blown up view of the control adapter of the present invention being attached to one of the control levers of a dual lever controlled lawn tractor.

FIG. 4 is a blown up view of the control adapter 100 of the present invention and only the levers of a dual lever lawnmower. In FIG. 4, the first clamping member 102a of the control adapter 100 is shown releasably 104a connected 108a to the first control lever 60a of a dual lever lawnmower. The second clamping member 102b of the control adapter 100 has not yet been releasably 104b connected 108b to the second control lever 60b of a dual lever lawnmower.

FIG. 5 is a perspective view of a preferred embodiment of the control adapter 100 of the present invention comprising a first clamping member 102a having a spring release 104a to actuate a first releasable connector 108a, a second clamping member 102b having a spring release 104b to actuate a second releasable connector 108b, and a single hand grip member 110. The single hand grip member 110 is flexibly connected 106a to the first clamping member 102a at one end and is flexibly connected 106b to the second clamping member 102b at the other end. In this embodiment, the single hand grip member 110 of the control adapter 100 is flexible and is shaped in a such a manner to allow the rider to use one hand to adjust the control adapter 100. In using the present invention, the operator exerts either a twisting force or a horizontal force with one hand on the single hand grip member 110 to simultaneously actuate the movement of the control levers of an existing dual lever lawnmower to both drive and steer the lawnmower.

FIG. 6 is a perspective view of another preferred embodiment of the control adapter 100 of the present invention comprising a first clamping member 102a having a spring release 104a to actuate a first releasable connector 102a, a second clamping member 102b having a fly nut release 105b to second releasable connector 109b, and a single hand grip member 110. The single hand grip member 110 is flexibly connected 106a to the first clamping member 102a at one end and is flexibly connected 106b to the second clamping member 102b at the other end. In this embodiment, the single hand grip member 110 of the control adapter 100 is flexible and is shaped in a such a manner to allow the rider to use one hand to adjust the control adapter 100 which results in simultaneously moving each of the opposing control levers of an existing dual lever lawnmower to both drive and steer the lawnmower.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A lawn tractor comprising:
   a frame;
   a seat supported by said frame;
   a drive system connected to said frame;
   a first drive wheel, said first drive wheel being operatively connected to said frame, said first drive wheel being selectively rotated by said drive system;
   a first control lever supported by said frame, said first control lever being operatively connected to said drive system, said first control lever independently controls the movement of said first drive wheel;
   a second drive wheel, said second drive wheel being operatively connected to said frame, said second drive wheel being selectively rotated by said drive system;
   a second control lever supported by said frame, said second control lever being operatively connected to said drive system, said second control lever independently controls the movement of said second drive wheel; and
   a control adapter having a first attachment member, said first attachment member being operatively connected to said first control lever; a second attachment member, said second attachment member being operatively connected to said second control lever; and a single hand grip member, said single hand grip member being operatively connected to said first attachment member and to said second attachment member, said single hand grip member actuating the movement of said first control lever in only a forward or a reverse direction and actuating the movement of said second control lever in only a forward or reverse direction.

2. The lawn tractor according to claim 1 further comprising a mower deck supported by said frame.

3. The lawn tractor according to claim 1 wherein said first attachment member is releasably connected to said first control lever.

4. The lawn tractor according to claim 3 wherein said second attachment member is releasably connected to said second control lever.

5. The lawn tractor according to claim 1 wherein said single hand grip member is rotationally connected to said first attachment member and to said second attachment member.

6. The lawn tractor according to claim 1 wherein said single hand grip member is flexibly connected to said first attachment member and to said second attachment member.

* * * * *